United States Patent
Bagal et al.

(10) Patent No.: US 8,924,951 B2
(45) Date of Patent: Dec. 30, 2014

(54) EMBEDDING PATCH LISTS WITHIN COMPILED PROGRAM CODE

(71) Applicant: Oracle International Corporation, Redwood Shores, CA (US)

(72) Inventors: Prasad V. Bagal, Saratoga, CA (US); Santhosh Selvaraj, Sunnyvale, CA (US); Mahanteshwar Chimangala Maheshwar, Foster City, CA (US); Harish Nandyala, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 162 days.

(21) Appl. No.: 13/832,381

(22) Filed: Mar. 15, 2013

(65) Prior Publication Data
US 2014/0282475 A1 Sep. 18, 2014

(51) Int. Cl.
*G06F 9/445* (2006.01)
(52) U.S. Cl.
CPC ................................ *G06F 8/65* (2013.01)
USPC ............ 717/171; 717/168; 717/174; 717/176
(58) Field of Classification Search
USPC .......................................................... 717/171
See application file for complete search history.

(56) References Cited

U.S. PATENT DOCUMENTS

| | | | | |
|---|---|---|---|---|
| 5,659,735 | A * | 8/1997 | Parrish et al. | 1/1 |
| 7,260,818 | B1 * | 8/2007 | Iterum et al. | 717/170 |
| 7,890,941 | B1 * | 2/2011 | Garud et al. | 717/158 |
| 2009/0187610 | A1 * | 7/2009 | Guo | 707/203 |
| 2010/0218176 | A1 * | 8/2010 | Spanner et al. | 717/170 |
| 2012/0180024 | A1 * | 7/2012 | Gonzalez et al. | 717/109 |

OTHER PUBLICATIONS

ELF-64 Object File Format, Version 1.4, May 20, 1997, http://h21007.www2.hp.com/portal/download/files/prot/files/STK/pdfs/elf-64-hp-pdf, accessed on Oct. 1, 2014.*
Stuckenholz, Component Evolution and Versioning State of the Art, ACM SIGSOFT Software Engineering Notes, vol. 30, No. 1, Jan. 2005.*
Cederqvist et al., Version Management with CVS, Copyright 1992, http://cern-accelerators-optics.web.cern.ch/cern-accelerators-optics/CVS_Apache/cvs_manual.pdf, access on Oct. 1, 2014.*

* cited by examiner

*Primary Examiner* — Wei Zhen
*Assistant Examiner* — Timothy Dunan
(74) *Attorney, Agent, or Firm* — Kraguljac Law Group, LLC (57) ABSTRACT

Systems, methods, and other embodiments associated with maintaining information about patches installed on a node are described. In one embodiment, a method includes, in response to installing a patch to a program, updating a list of installed patches in a computer by adding an identifier of the patch to the list of installed patches. The method also includes embedding the updated list of installed patches into compiled binary code of the program.

22 Claims, 5 Drawing Sheets

EMBEDDING PATCH LISTS WITHIN COMPILED PROGRAM CODE

BACKGROUND

Cluster computing often involves a plurality of nodes (e.g., computers) connected together through a communication network to collectively perform a processing task. Accordingly, the plurality of nodes exchange communications over the communication network when performing the processing task. However, if, for example, the plurality of nodes are not using a same version of a program, then difficulties with the communications can occur. Additionally, ensuring consistency between versions of programs on each node to avoid the difficulties in communications is a complex task.

BRIEF DESCRIPTION OF THE DRAWINGS

The accompanying drawings, which are incorporated in and constitute a part of the specification, illustrate various systems, methods, and other embodiments of the disclosure. The illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with maintaining information about patches installed on a node are described. For example, consider that each node in a cluster of nodes may have many different programs and patches for those programs installed. Further consider that communication errors and other errors (e.g., processing errors) can occur between nodes when just one node communicating in the cluster is using a different configuration of installed patches. However, maintaining an accurate list of patches installed on a node can be difficult.

For example, when installing a patch on a node, if the list of installed patches is updated prior to completing installation of the patch and the installation subsequently fails, then the list can inaccurately identify the patch as being installed when the patch actually is not installed. Additionally, maintaining a list of installed patches as an independently accessible file can expose the list to unintentional and/or malicious alteration that can further endanger accuracy of the list. Inaccuracies in the list of installed patches can lead the node to communicate with the network when the node is configured in an unauthorized manner, which can cause errors among the cluster of computing nodes.

Accordingly, in one embodiment, a node maintains a list of installed patches by embedding the list as part of compiled code of a program on the node and updating the list as a part of installing a patch to the program or another program. In this way, the node maintains an accurate list of installed patches. Additionally, the node can then use the list of installed patches to authenticate which patches are installed on the node against a master list of installed patches for a cluster before communicating in the cluster. Thus, the node ensures that a current configuration of patches is installed and that the node will not cause communication errors within the cluster.

Figure 1:
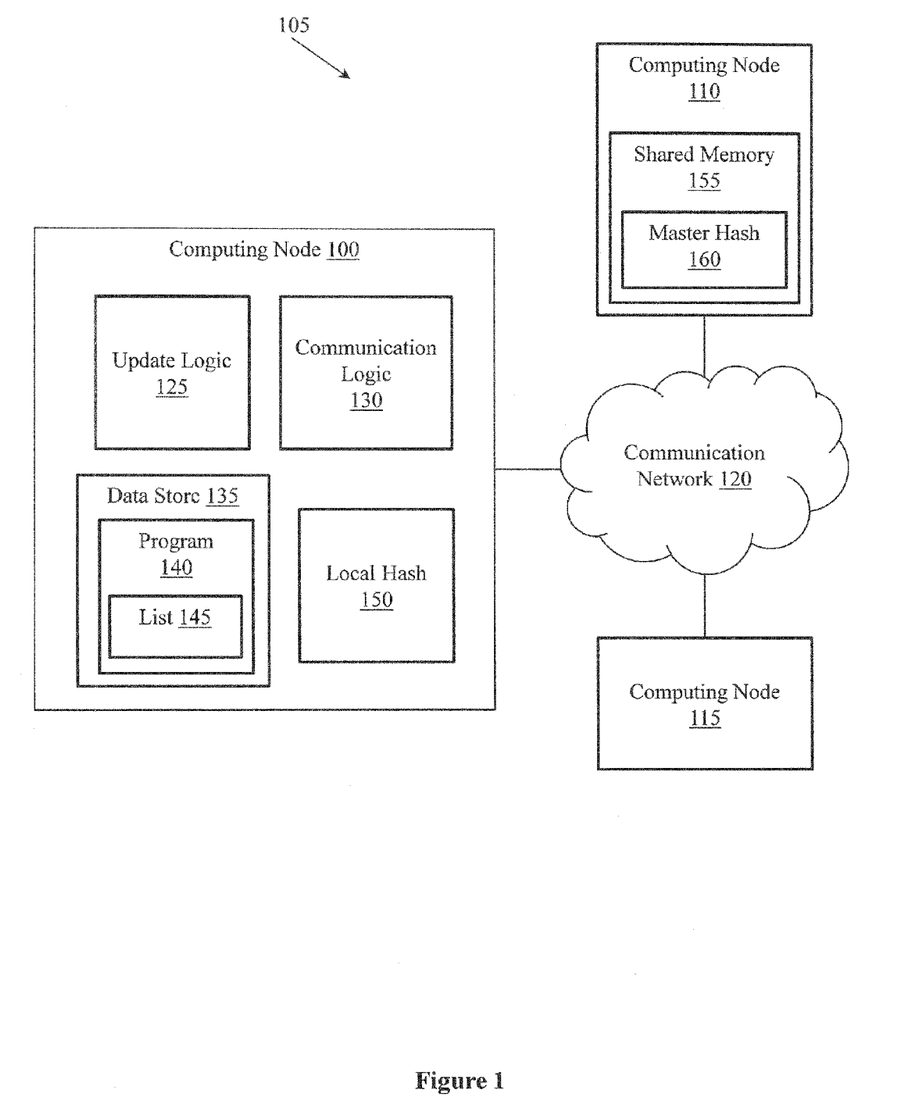
FIG. 1 illustrates one embodiment of a computing node associated with maintaining information about patches installed on the computing node.

With reference to FIG. 1, one embodiment of a computing node 100 associated with maintaining information about patches installed on the computing node 100 is illustrated. The computing node 100 is part of a cluster computing system 105 that includes a plurality of computing nodes, e.g., computing nodes 100, 110 and 115. Only three computing nodes are illustrated in FIG. 1, however, the cluster computing system 105 may include more or less computing nodes than illustrated (e.g., 2, 5, 10, 100, etc.). The plurality of computing nodes of the cluster computing system 105 communicate with each other via a communication network 120 and are configured to, for example, collectively perform a processing task in parallel or other functions. The communication network 120 is, for example, a high speed local area network (LAN), or other communication network that permits the plurality of computing nodes to exchange information when performing the processing task.

Consider in one example that one or more nodes in the plurality of computing nodes performs a subset of the processing task simultaneously and in parallel with other nodes in the cluster computing system 105. By dividing a larger processing task into smaller pieces and processing the smaller pieces at different nodes, the cluster computing system 105 can collectively perform the larger processing task more quickly than if performed by only a single node. However, for each node to consistently perform the processing task and to prevent communication and other errors, the cluster computing system 105 should ensure that each node is configured in the same way relative to the task. That is, each of the plurality of nodes (e.g., 100, 110, and 115) should have the same programs and patches for the programs installed.

Consider the computing node 100, which includes update logic 125 communication logic 130, and a data store 135. In one embodiment, each of the plurality of nodes in the computing cluster system 105 are configured in a similar manner to the computing node 100. In this way, each of the nodes of the cluster computing system 105 maintains a list of installed patches and can verify patches installed on the node before communicating in the cluster computing system 105.

For example, the update logic 125 of the computing node 100 is configured to update, in response to an installation of a patch to a program (e.g. program 140), a list 145 of patches installed on the computing node 100. The list 145 is in electronic form. In one embodiment, the list 145 is embedded within compiled code of the program 140. That is, the list 145 is disposed in a predefined location within compiled code of the program 140 that is in binary form (e.g., machine language). Accordingly, the list 145 is integrated with and part of the program 140. However, the list 145 is configured and embedded as a non-operational portion of the compiled code of the program 140. In one embodiment, the program 140 is an operating system (OS), a cluster client program or more generally any program that is resident on the computing node 100. The program is stored in the data store 135, which is a hard disk drive, solid state drive, or any storage device within the computing node 100 that stores programs that are executable by the computing node 100 using a processor.

In one embodiment, the computing node 100 includes many different installed programs that are stored within the data store 135 or another storage location within the computing node 100. Accordingly, the patch being installed can be for any of the programs installed on the computing node 100 and need not be for the program 140 within which the list 145 resides. That is, the list 145 is embedded within the program 140 (e.g., an operating system of the node 100) and can include identifiers of patches for programs other than the program 140 that are also installed on the computing node 100.

Thus, the update logic 125 is configured to extract the list 145 from the program 140 and to update the list 145 with an identifier of the patch that is being installed. In general, the list 145 includes, for example, unique identifiers for some or all patches installed on the computing node 100. In this way, the computing node 100 can maintain a centralized list of patches that have been installed. After the list 145 is updated, the update logic 125 embeds the list 145 back into the compiled code of the program 140. In one embodiment, the update logic 125 uses a linker to link the update list 145 into the program 140 as a library file (e.g. assembly file).

The list 145 can then be referenced and used by the computing node 100. For example, the communication logic 130 is configured to use the list 145 to authenticate a profile of which patches are installed on the computing node 100. The list 145 is used to determine if the node 130 has the correct patches that match with the patches that are reported to be installed on the cluster computing system 105. The communication logic 130 is configured to control whether the node 100 is permitted or restricted from communicating with other nodes in the cluster 105 based on the list 145. For example, if the node 100 is missing patch that should have been installed, communication with the cluster is prohibited (at least with respect to the associated program and patch) until the missing patch is installed.

In one embodiment, to determine if the list 145 includes the correct patches, the communication logic 130 is configured to access a shared memory 155 to retrieve a master hash 160. The master hash 160 is, for example, a hash of a master list of patches that specifies which patches should be installed (e.g., already installed) on a node in order for the node to communicate in the cluster computing system 105. The communication logic 130 compares the master hash 160 against a hash of the list 145 to determine whether the computing node 100 has the patches specified in the master list installed.

In this way, the communication logic 130 can ensure that programs/patches installed on the computing node 100 are consistent with patches installed on other nodes in the cluster computing system 105. Thus, the computing node 100 proactively avoids difficulties with causing errors when communicating because of possible discrepancies with installed patches/programs by authenticating the list 145 against the master list.

Figure 2:
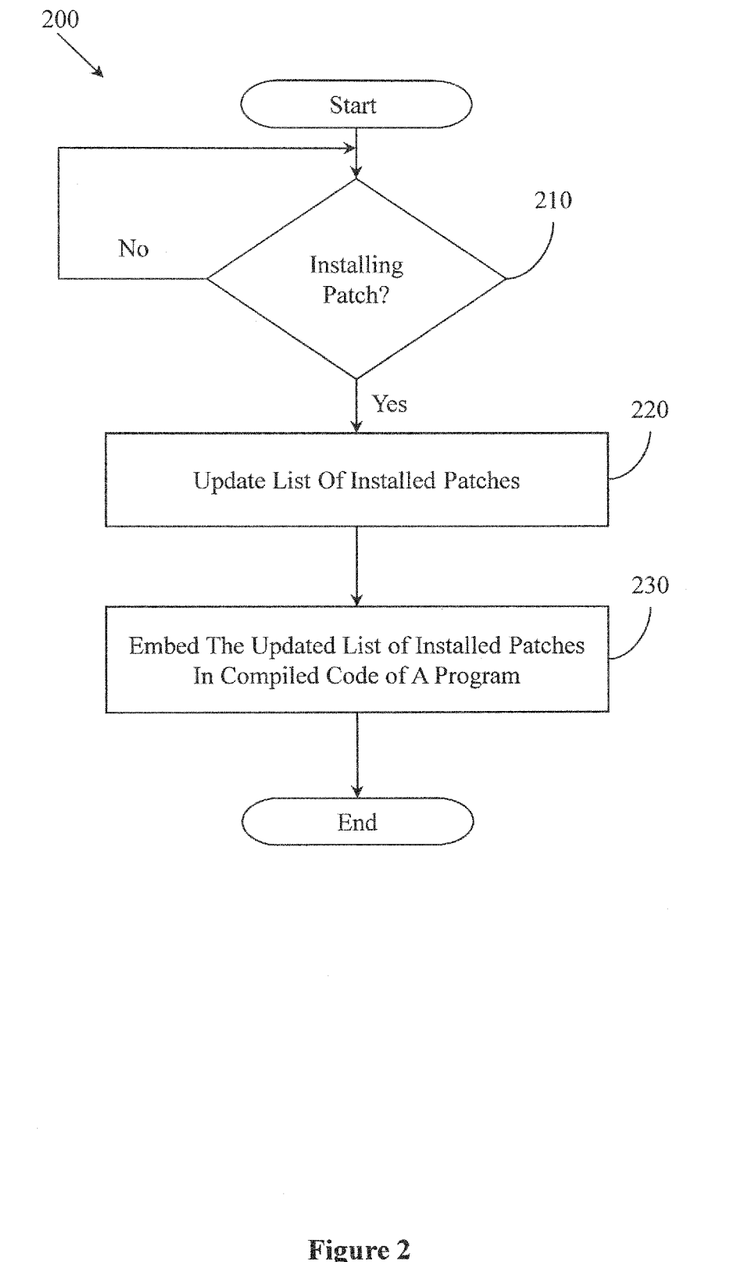
FIG. 2 illustrates one embodiment of a method associated with maintaining information about patches installed on a node.

Further details of maintaining the list of installed patches and communicating in the cluster computing system 105 will be discussed with reference to FIG. 2. FIG. 2 illustrates a method 200 associated with maintaining a list of installed patches and communicating in a cluster of computing nodes. FIG. 2 will be discussed from the perspective of the computing node 100 of FIG. 1.

At 210, the computing node 100 detects the installation of a patch to a program (e.g., the program 140). In response to the installation of the patch, the computing node 100 proceeds to block 220. However, if no installation is detected at 210 then the computing node 100 waits until an installation is detected before proceeding. In one embodiment, an installation is an initiation of an installation of a patch, installation of a patch to a predefined percentage (e.g., 50%), and so on. In another embodiment, an installation is completion of installing a patch. In either case, the computing node 100 is, for example, configured to guarantee that the patch has successfully been installed before finalizing the list of installed patches by embedding the updated list at 230. In this way, the computing node 100 ensures that the list 145 is not incorrectly updated with an identifier of a patch that fails to properly install.

Continuing with method 200, at 220, the computing node 100 updates the list of installed patches by adding an identifier of the patch to the list 145. The identifier is, for example, a unique identifier of the patch that differentiates and uniquely identifies the patch from many other patches that are installed on the computing node 100.

At 230, the computing node 100 embeds the updated list 145 into compiled code of the program 140. In one embodiment, the computing node 100 is configured to translate the list into a binary format and to link the list into the program in a predefine location when the program 140 is loaded and executed. In this way, the list 145 is integrated with the compiled binary code of the program 140 and, thus, the list 145 becomes an integral linked part of the program 140. In general, block 220 and block 230 of method 200 are part of one atomic transaction that updates the list 145. Furthermore, the method 200 along with installation of the patch may occur while the computing node 100 is on-line or off-line. In one embodiment, the computing node 100 performs the method 200 online without being restarted. Accordingly, installation of the patch is effective without restarting the computing node 100.

Figure 3:
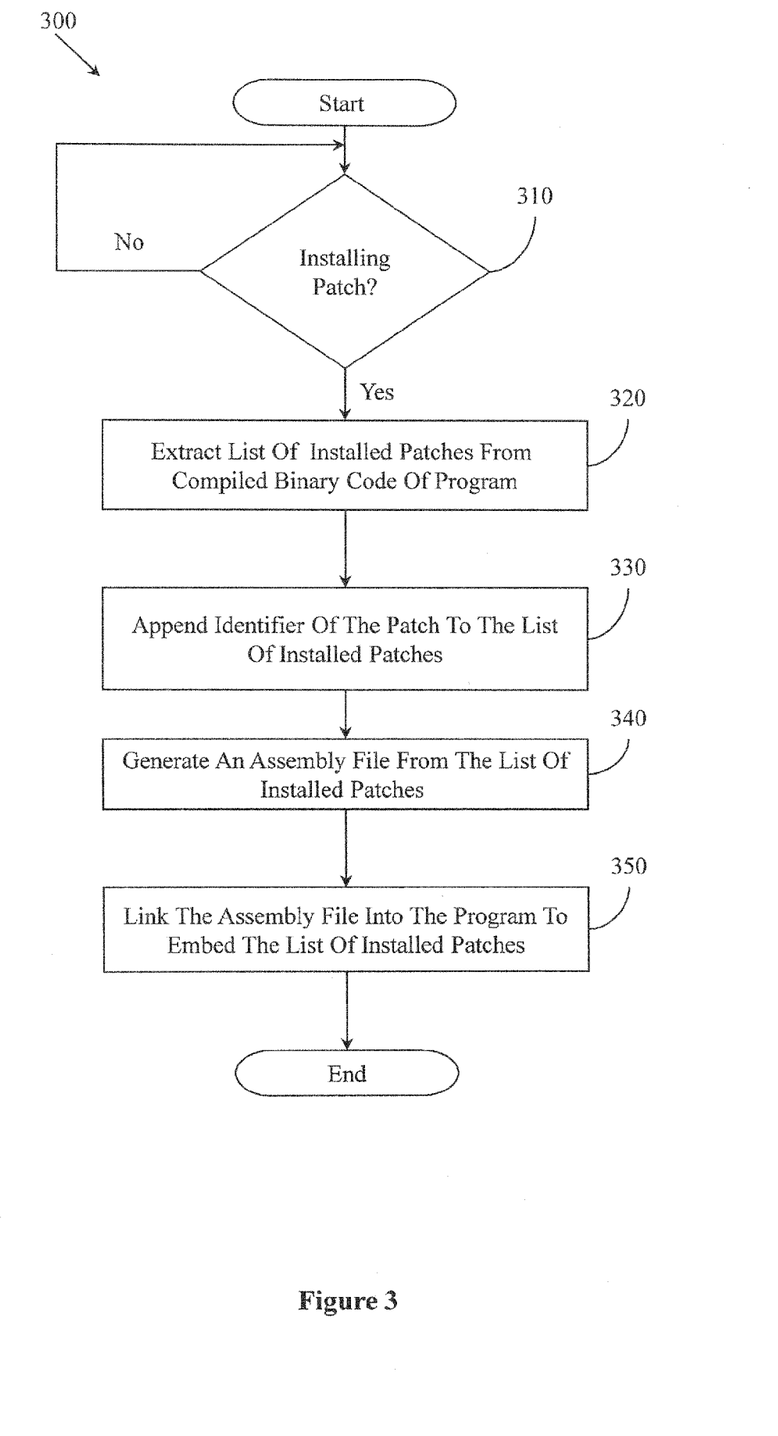
FIG. 3 illustrates one embodiment of a method associated with maintaining information about patches installed on a node.

Further details of updating the list 145 will be discussed with reference to FIG. 3. FIG. 3 illustrates a method 300 associated with maintaining information about patches installed on a node. The method 300 will be discussed from the perspective of the computing node 100 of FIG. 1.

At 310, the computing node 100 detects the installation of a patch to a program (e.g., the program 140). In response to the installation of the patch, the computing node 100 proceeds to block 320. However, if no installation is detected at 310 then the computing node 100 waits until an installation is detected before proceeding to update the list 145.

At 320, the computing node 100 extracts the list 145 of installed patches from the compiled binary code of the program 140. In one embodiment, the list 145 is located at a predefined location in the program 140. The predefined location is, for example, a location that does not affect operation of the program 140 and is quickly accessible. In this way, the computing node 100 can identify the list 145 from the compiled binary code without interfering with operation of the program 140 and/or installation of the patch.

At 330, the computing node 100 appends an identifier of the patch to the extracted list 145 of installed patches to produce an updated list 145 of installed patches. In one embodiment, the identifier is in binary and is added to the list 145 after other entries. In either case, the identifier of the patch is grouped with identifiers already in the list to produce the updated list 145, which reflects all patches and programs installed on the computing node 100.

At 340, the computing node 100 generates an assembly file from the updated list 145 of installed patches. The assembly file includes, for example, the updated list of installed patches in binary, in a common intermediate language (CLI), an intermediate language (i.e., assembly), or another form. The assembly file is, in general, a partially compiled library or executable file that is dynamically joined with other compiled or partially compiled files/libraries of the program 140 to form a complete version of the program 140 once linked together.

Accordingly, at 350, the computing node 100 links the assembly file into the program 140 to embed the updated list 145 of installed patches into compiled binary code of the program 140. In one embodiment, linking the assembly file translates the list 145 and other contents of the assembly file into machine code (e.g., binary). Additionally, linking the assembly file into the program 140 embeds the updated list 145 into the program 140 to dynamically mark the program 140 with the updated list 145. In this way, the computing node 100 marks the program 140 in-line with the complied binary code of the program 140.

Additionally, the computing node 100 uses, for example, a linker to transform the assembly file into machine code and to embed the transformed assembly file into a predetermined location in the compiled binary code of the program 140. Accordingly, the computing node 100 imprints/marks the program 140 with the updated list 145 of installed patches and thereby protects the updated list 145 from alteration while providing a reliable and consistent resource for determining which patches are installed on the computing node 100.

Figure 4:
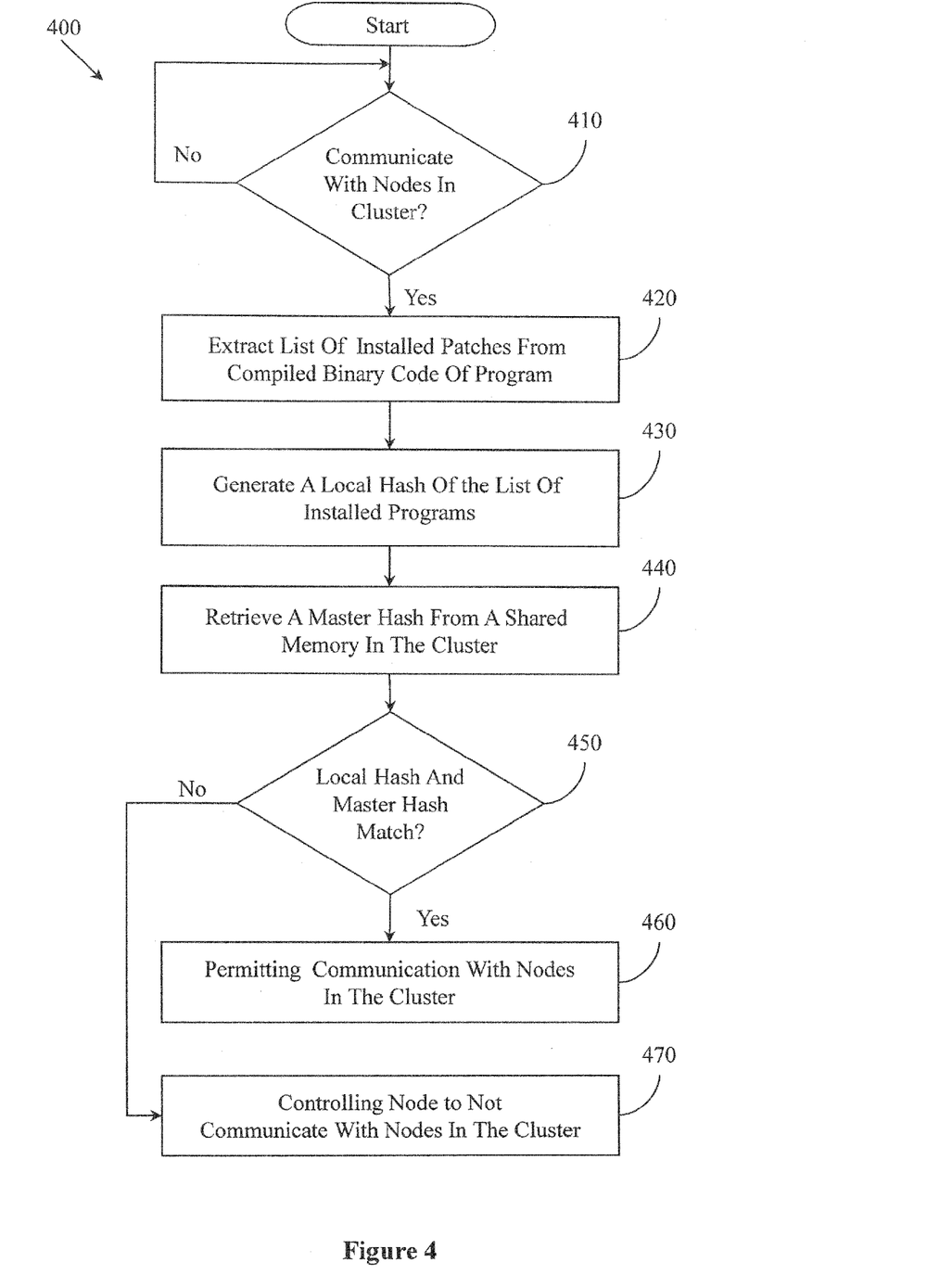
FIG. 4 illustrates one embodiment of a method associated with communicating in a cluster computing system.

Furthermore, the computing node 100 can use the list 145 that is embedded within the program 140 for several different purposes. In one embodiment, the computing node 100 uses the list 145 of installed patches to authenticate whether patches installed on the computing node 100 are consistent with patches installed on other nodes of the plurality of nodes. For example and with reference to FIG. 4, one embodiment of a method 400 associated with initiating communications in a cluster of computing nodes is illustrated. FIG. 4 will be discussed from the perspective of the computing node 100 of FIG. 1.

At 410, the computing node 100 determines whether to initiate communications with nodes (e.g., computing nodes 110 and 115) in the cluster computing system 105. For example, the computing node 100 determines whether to initiate communications with other nodes when returning from an inactive state of not communicating. The inactive state is, for example, a powered off state, from installing a patch, or generally from any state of not communicating with other nodes for a period of time that is sufficient to reset communications or be considered inactive. Accordingly, when returning to an active state after not communicating with other computing nodes, the computing node 100 proceeds to block 420 of method 400.

At 420, the computing node 100 extracts the list 145 of installed patches from compiled binary code of the program 140. In one embodiment, extracting the list 145 includes locating the list 145 within the binary code and reading the list 145 from within the binary code. In another embodiment, the computing node 100 also translates the list 145 from binary (i.e., machine code) or another intermediate form into an American Standard Code for Information Interchange (ASCII), text, or other usable form.

The computing node 100 uses the list 145 to generate a local hash 150 at 430. The local hash is, for example, a hash of the list 145 of installed patches using a hash key (i.e., a cryptographic key or other numeric value) and a hash algorithm to produce the local hash 150. The local hash 150 uniquely identifies the installed patches on the computing node 100 in an abbreviated form in comparison to the actual list 145. That is, the local hash 150 is, for example, comparatively smaller than the list 145 (e.g., 128 bits vs. 512 bits or more).

At 440, the computing node 100 retrieves the master hash 160 from the shared memory 155 in the cluster of computing nodes. The shared memory 155 is, for example, directly addressable by the computing node 100 and other nodes in the cluster computing system 105. Furthermore, in one embodiment, the computing node 100 can include the shared memory 155. However, in general, the shared memory 155 is a memory that is shared by and accessibly by all nodes in the cluster computing system 105 and the shared memory may reside on any individual node or in another location.

The master hash 160 is a hash of a master list of installed patches for patches that are to be installed on each node in the plurality of nodes (e.g., 100, 110, 115) to communicate as an authorized node in the cluster computing system 105. That is, the master list of installed patches includes patches that are installed on each node that is communicating. Accordingly, the master list identifies which patches a node (e.g., the computing node 100) should have installed to communicate with other nodes in the cluster computing system 105. In this way, the computing node 100 determines a configuration of other nodes in the computing system 105.

At 440, when the computing node 100 attempts to retrieve the master hash 160, the master hash 160 may not yet exist/be available. For example, if the master hash 160 is not available then the computing node 100 is the first node to initiate communications in the cluster computing system 105. That is, the computing node 100 is the first node to boot up or attempt to communicate after, for example, a new patch has been installed. Accordingly, the computing node 100 publishes a hash of the list 145 to the shared memory 155. The hash of the list 145 then becomes the master hash 160 that other computing nodes (e.g., the computing node 110 and 115) download and compare with their own local hashes.

Furthermore, while the master hash 160 is discussed as being retrieved by the computing node 100, in other embodiments, the computing node 100 retrieves the master list itself. Accordingly, the computing node 100 generates the master hash 160 from the master list or directly compares the list 145 and the master list at 450.

At 450, the computing node 100 compares the local hash 150 with the master hash 160 to determine whether patches from the master list are installed on the computer. That is, by comparing the master hash 160 with the local hash 150 the computing node 100 determines whether a configuration of patches installed on the computing node 100 is the same as other nodes (e.g., computing nodes 110 and 115). If the local hash 150 and the master hash 160 match, then the computing node 100 proceeds to block 460. However, if the local hash 150 and the master hash 160 do not match, then the computing node 100 proceeds to block 470. In one embodiment, even though the hashes do not match, the computing node 100 may still proceed to block 460 and be permitted to communicate with other nodes.

For example, when nodes (e.g., 100, 110, 115) in the cluster computing system 105 are being updated, a management source (not illustrated) of the cluster computing system 105 can issue a rolling patch command to nodes in the cluster computing system 105. The rolling patch command permits nodes of the cluster computing system 105 to communicate with other nodes when a local hash (e.g., local hash 150) does not match the master hash 160. In general, the nodes can still communicate if the local hash matches a different hash that corresponds with a subset of patches from the master list of installed patches (e.g., all patches except a patch presently being installed). In one embodiment, when a node matches the subset of patches but not the master list itself, the node may communicate at a reduced functionality level (e.g., restricted mode) that includes restrictions on how the node participates in the cluster computing system 105. That is, a node that only matches the subset of patches may not be permitted to perform certain tasks but can still communicate. In this way, communications can continue while nodes are being updated. Additionally, when the rolling patch is complete and all nodes in the cluster computing system 105 should be updated, nodes are restricted to communicating (e.g., participating in the cluster computing system 105 as a node) upon verifying that a local hash matches the master hash to ensure the nodes are homogenous in terms of installed patches.

In one embodiment, an external command (e.g., stop rolling patch) from, for example, a management source triggers nodes in the cluster computing system 105 to verify a local hash against the master hash before communicating in the cluster computing system 105 and the cluster computing system 105 may then transition back to a fully functional processing node upon all nodes communicating being homogenously patched.

Continuing with method 400, at 460, the computing node 100 is permitted to communicate with the cluster of computing nodes 105 when the local hash 150 matches the master hash 160. In this way, the computing node 100 verifies that a local configuration of patches matches a configuration of other nodes in the cluster computing system 105. Accordingly, errors in communications that can be difficult to diagnose can be avoided by ensuring a node is properly configured before communicating in the cluster computing system 105.

At 470, the computing node 100 decides to not communicate with other nodes in the cluster. In one embodiment, the node 100 controls its communications by a self-imposed restriction if the node 100 determines that one or more patches are missing (e.g., hashes do not match). The computing node 100 does not communicate with the other nodes because a configuration of the computing node 100 does not match a configuration of other nodes as determined at 450 from the comparison of hashes 150 and 160. Instead, the computing node 100, for example, issues an alert to a management source, determines a missing patch, requests the missing patch, or, more generally, isolates itself from creating errors that would occur if the computing node 100 were to communicate with other nodes in the cluster computing system 105. In this way, the computing node 100 helps the cluster computing system 105 maintain consistency between nodes in the cluster computing system 105 by controlling whether or not the node 100 should continue communicating with other nodes.

Figure 5:
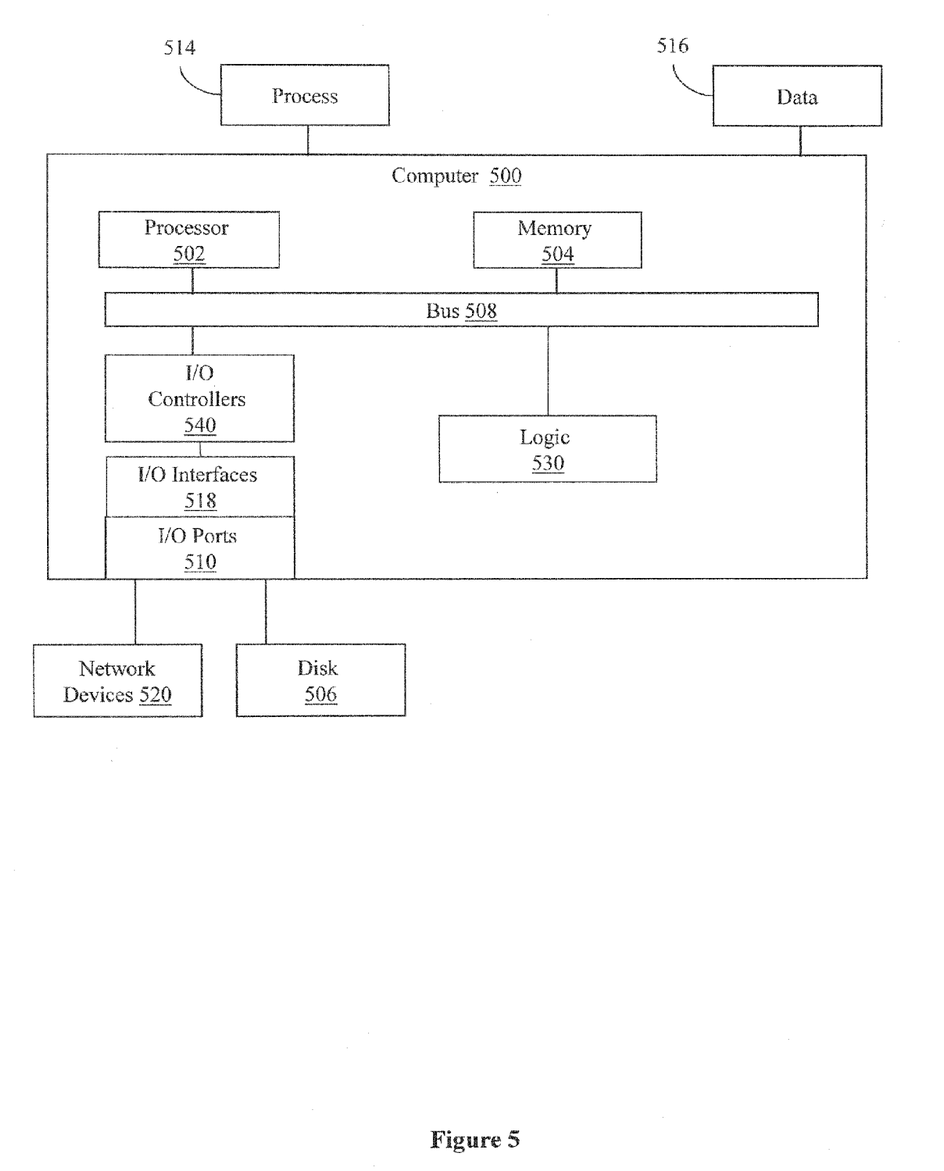
FIG. 5 illustrates an embodiment of a computing system in which example systems and methods, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a logic 530 configured to maintain information about patches installed on a node. Logic 530 is configured with functions as the update logic 125 and/or communication logic 130 of FIG. 1 and/or is configured to perform the methods of FIGS. 2-4. In different examples, the logic 530 may be implemented in hardware, a non-transitory computer-readable medium with stored instructions, firmware, and/or combinations thereof to perform the methods of FIGS. 2-4. While the logic 530 is illustrated as a hardware component attached to the bus 508, it is to be appreciated that in one example, the logic 530 could be implemented in the processor 502.

Generally describing an example configuration of the computer 500, the processor 502 may be a variety of various processors including dual microprocessor and other multiprocessor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the I/O interfaces 518, and/or the I/O ports 510. Through the network devices 520, the computer 500 may interact with a network. Through the network, the computer 500 may be logically connected to remote computers. Networks with which the computer 500 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d, Ed. 1995).

What is claimed is:

1. A non-transitory computer-readable medium storing computer-executable instructions comprising:
    instructions for, in response to installing a patch to a program, updating, by a computer, a list of installed patches in the program by adding an identifier of the patch to the list of installed patches, wherein updating the list of installed patches includes generating an assembly file from the updated list of installed patches, wherein the assembly file includes the updated list of installed patches in binary; and
    instructions for embedding the updated list of installed patches into compiled binary code of the program by linking the assembly file into the program to embed the updated list of installed patches into the compiled binary code of the program.

2. The non-transitory computer-readable medium of claim 1, wherein the instructions for updating the list of installed patches by adding the identifier include instructions for:
    extracting, by the computer, the list of installed patches from the compiled binary code; and
    appending the identifier of the patch to the list of installed patches to produce the updated list of installed patches, wherein the identifier is in binary.

3. The non-transitory computer-readable medium of claim 1, further comprising:
    instructions for controlling whether the program is permitted to communicate with a cluster of computing nodes based, at least in part, on the updated list of installed patches, wherein the program is a node in the cluster of computing nodes, and wherein the cluster of computing nodes are separate instances of the program.

4. The non-transitory computer-readable medium of claim 3, wherein instructions for communicating with the cluster of computing nodes based, at least in part, on the updated list of installed patches include instructions for:
    generating a local hash from the updated list of installed patches extracted from the program;
    retrieving a master hash from a shared memory in the cluster of computing nodes, wherein the master hash is a hash of a master list of installed patches for patches installed on each node in the cluster of computing nodes that is authorized to communicate;
    comparing the local hash with the master hash to determine whether patches from the master list are installed on the program; and
    determining whether communication with the cluster of computing nodes is permitted or restricted based on if the local hash matches the master hash.

5. The non-transitory computer-readable medium of claim 4, wherein the instructions for communicating with the cluster of computing nodes include instructions for permitting communication if the local hash matches a rolling update hash that identifies a subset of patches from the master list when the cluster of nodes are being updated.

6. The non-transitory computer-readable medium of claim 1, wherein the instructions for embedding the updated list of installed patches into the compiled binary code of the program dynamically mark the program in-line with the complied binary code as being updated with the list of installed patches, and wherein the assembly file is a dynamically loadable module that includes the updated list of installed patches.

7. The non-transitory computer-readable medium of claim 1, wherein linking the assembly file into the program is performed by a linker.

8. The non-transitory computer-readable medium of claim 1, wherein the instructions for linking the assembly file into the program embed the updated list in a predetermined location in the compiled binary code of the program.

9. The non-transitory computer-readable medium of claim 1, further comprising:
instructions for controlling whether the program is permitted to join a cluster of computing nodes based, at least in part, on the updated list of installed patches.

10. A cluster computing system, comprising:
a plurality of computing nodes arranged in a cluster and configured to communicate over a network;
a shared memory configured to store a master list of installed patches, wherein the shared memory is accessible by the plurality of computing nodes,
wherein each node of the plurality of computing nodes includes:
an update logic configured to update a list of installed patches in the node in response to installing a patch to a program in the node, wherein updating the list includes adding an identifier of the patch to the list of installed patches and embedding the updated list of installed patches into compiled binary code of the program, wherein the update logic is configured to update the list of installed patches by:
generating an assembly file from the updated list of installed patches, wherein the assembly file includes the updated list of installed patches in binary, and
linking the assembly file into the program to embed the updated list of installed patches into compiled binary code of the program, and
a communication logic configured to control whether a node is permitted to communicate with the plurality of computing nodes based, at least in part, on the updated list of installed patches.

11. The cluster computing system of claim 10, wherein the update logic is configured to update the list of installed patches by:
extracting the list of installed patches from the compiled binary code; and
appending the identifier of the patch to the list of installed patches to produce the updated list of installed patches, wherein the identifier is in binary,
wherein the plurality of computing nodes are separate instances of the program and wherein the assembly file is a dynamically loadable module that includes the updated list of installed patches.

12. The cluster computing system of claim 10, wherein the communication logic is configured to permit communication from the node with the plurality of computing nodes upon verifying that the updated list of installed patches for the node matches the master list of installed patches retrieved from the shared memory.

13. The cluster computing system of claim 10, wherein the communication logic is configured to determine whether to permit communication with the plurality of computing nodes by:
generating a local hash from the updated list of installed patches extracted from the program;
retrieving a master hash from a shared memory in the cluster of computing nodes, wherein the master hash is a hash of a master list of installed patches for patches installed on each node in the cluster of computing nodes that is authorized to communicate;
comparing the local hash with the master hash to determine whether patches from the master list are installed on the computer; and
permitting communication with the cluster of computing nodes if the local hash matches the master hash and restricting communication if the local hash does not match.

14. The cluster computing system of claim 10, wherein the update logic is configured to embed the updated list of installed patches into the compiled binary code of the program by dynamically marking the program in-line with the complied binary code as being updated.

15. The cluster computing system of claim 10, wherein the identifier is a unique identifier that differentiates the patch from other patches on the list of installed patches.

16. The cluster computing system of claim 10, wherein the update logic is configured to embed the updated list of installed patches into compiled binary code of the program by imprinting the updated list of installed patches onto the program.

17. The cluster computing system of claim 10, wherein the communication logic is configured to permit the node to join the plurality of computing nodes upon verifying that the updated list of installed patches for the node matches the master list of installed patches retrieved from the shared memory.

18. A method comprising:
in response to installing a patch to a program, updating, by at least a processor of a computer, a list of installed patches in the program by adding an identifier of the patch to the list of installed patches; and
embedding, by at least the processor, the updated list of installed patches into compiled binary code of the program, wherein embedding the updated list of installed patches includes:
generating an assembly file from the updated list of installed patches, wherein the assembly file includes the updated list of installed patches in binary; and
linking the assembly file into the program to embed the updated list of installed patches into compiled binary code of the program.

19. The method of claim 18, wherein updating the list of installed patches includes:
extracting, by the computer, the list of installed patches from the compiled binary code; and
appending the identifier of the patch to the list of installed patches to produce the updated list of installed patches, wherein the identifier is in binary.

20. The method of claim 18, further comprising:
communicating with a cluster of computing nodes based, at least in part, on the updated list of installed patches, wherein the cluster of computing nodes are separate instances of the program and wherein the assembly file is a dynamically loadable module that includes the updated list of installed patches.

21. The method of claim 18, further comprising:
comparing the updated list of installed patches with a master list of installed patches to determine whether patches from the master list are installed in the program, wherein the master list is retrieved from a shared memory in a cluster computing system; and
controlling whether communication by the node with one or more nodes in the cluster computing system is permitted or restricted based on whether the updated list of patches matches the master list.

22. The method of claim 18, further comprising:
joining a cluster of computing nodes based, at least in part, on the updated list of installed patches.

* * * * *

UNITED STATES PATENT AND TRADEMARK OFFICE
CERTIFICATE OF CORRECTION

| | | |
|---|---|---|
| PATENT NO. | : 8,924,951 B2 | Page 1 of 1 |
| APPLICATION NO. | : 13/832381 | |
| DATED | : December 30, 2014 | |
| INVENTOR(S) | : Bagal et al. | |

It is certified that error appears in the above-identified patent and that said Letters Patent is hereby corrected as shown below:

On the title page item (56), column 2, under Assistant Examiner, line 1, delete "Timothy Dunan" and insert -- Timothy Duncan --, therefor.

Signed and Sealed this
First Day of September, 2015

Michelle K. Lee
*Director of the United States Patent and Trademark Office*